United States Patent [19]

Funabashi

[11] Patent Number: 4,621,680
[45] Date of Patent: Nov. 11, 1986

[54] COOLING SYSTEM FOR MOTORCYCLE ENGINE

[75] Inventor: Kunio Funabashi, Kawagoe, Japan

[73] Assignee: Honda Giken Kogyo Kabushiki Kaisha, Tokyo, Japan

[21] Appl. No.: 533,856

[22] Filed: Sep. 20, 1983

[30] Foreign Application Priority Data

Sep. 29, 1982 [JP] Japan .................. 57-170744

[51] Int. Cl.$^4$ .......................... B62K 11/04; F01P 9/04
[52] U.S. Cl. .................................. 165/44; 123/41.57; 180/229; 165/51
[58] Field of Search ................. 165/44, 51; 123/41.52, 123/41.57, 41.69; 180/229

[56] References Cited

U.S. PATENT DOCUMENTS

| | | | |
|---|---|---|---|
| 2,442,302 | 5/1948 | Mallory | 123/41.57 |
| 2,713,852 | 7/1955 | Trout | 123/56 AC X |
| 2,792,899 | 5/1957 | Piatti | 180/229 |
| 3,129,700 | 4/1964 | Peterson | 123/56 AC |
| 4,108,118 | 8/1978 | George | 123/41.57 |
| 4,445,587 | 5/1984 | Hillman | 165/44 X |

FOREIGN PATENT DOCUMENTS

| | | | |
|---|---|---|---|
| 0005424 | 1/1980 | Japan | 123/41.69 |
| 95448 | 7/1922 | Switzerland | 123/41.52 |

Primary Examiner—Sheldon J. Richter
Assistant Examiner—Randolph A. Smith

[57] ABSTRACT

In a motorcycle engine having front and rear engine blocks arranged along the longitudinal line of a vehicle body, the front engine block is equipped with cooling fins for air-cooling and the rear engine block is provided with a water jacket for water-cooling. The engine may be a V-type engine or a horizontal opposed-type engine. The present invention is applicable to a motor scooter having left and right steps for placement of the feet of the driver to place his feet, the steps being installed in the lower portion of the vehicle body between the front and rear wheels of the vehicle.

11 Claims, 6 Drawing Figures

COOLING SYSTEM FOR MOTORCYCLE ENGINE

BACKGROUND OF THE INVENTION

1. Field of the Invention

This invention relates to a cooling system for a horizontal engine whose front and rear engine blocks are arranged in the longitudinal direction of the vehicle body.

2. Description of Prior Art

In a conventional motorcycle having a horizontal engine (its crank shaft making a right angle with the longitudinal direction of the vehicle body) with front and rear engine blocks arranged along the longitudinal direction of the vehicle body, use has been made of an air cooled engine with cooling fins on the peripheries of the front and rear engine blocks or a water cooled engine with water jackets on the peripheries of the front and rear engine blocks.

In the case of an air cooled engine, although the front engine block is cooled effectively and directly by the wind produced on traveling, there is a disadvantage that the rear engine block may not be cooled sufficiently because it is negligably exposed to the passing wind. Meanwhile, as regards the water cooled engine, although an excellent cooling effect is achievable, a drawback is that water cooling equipment such as a large capacity water pump or radiator is required, this undesirably increasing not only the weight but also the cost of the motorcycle.

SUMMARY OF THE INVENTION

An object of the present invention is to provide an engine for a motorcycle with an excellent output balance as a whole by installing an air cooled type front engine block and, as the rear engine block which is hard to cool, a water cooled engine block.

Another object of the present invention is to reduce the cost of the cooling system and to make an engine compact without decreasing the overall cooling effect by installing water cooling equipment such as a water pump and a radiator with a capacity smaller than that employed to cool the entire engine.

Still another object of the present invention is to facilitate the layout and installation of an engine by making the entire engine compact due to reduction of the size of the cooling equipment.

To accomplish the above objects according to the present invention, there is proposed an engine for a motorcycle with front and rear engine blocks arranged in the longitudinal direction of the vehicle body, said engine being equipped with an air cooled type front engine block having cooling fins on its periphery and a water cooled type rear engine block having water jackets on its periphery.

Also according to the present invention, it is proposed in a seating type motorcycle provided with left and right steps for resting the driver's feet in the lower portion of the vehicle body between the front and rear wheels that a horizontal opposed engine with front and rear engine blocks arranged respectively in front and behind the lower portion of the vehicle body between the front and rear wheels is mounted so that its crankshaft makes a right angle with the longitudinal direction of the vehicle body, the front engine block being of an air cooled type with cooling fins provided on its periphery, the rear engine block being of a water cooled type with water jackets on the periphery thereof.

Other objects, features and advantages of the present invention will be made clear by the following detailed description of preferred embodiments thereof by reference to the drawings.

BRIEF DESCRIPTION OF THE DRAWINGS

FIGS. 1 through 3 show a first embodiment of the present invention, wherein FIG. 1 is a side view of a motorcycle equipped with an engine constructed in accordance with the present invention, FIG. 2 is a front view of the engine, and FIG. 3 is a development along the line III—III in FIG. 1.

FIGS. 4 through 6 show a second embodiment of the invention, wherein FIG. 4 is a side view of a motor scooter equipped with the engine constructed in accordance with the present invention, FIG. 5 is an enlarged transverse sectional view taken on line V—V in FIG. 4, and FIG. 6 is an enlarged longitudinal cross sectional view taken on line VI—VI in FIG. 4.

DESCRIPTION OF PREFERRED EMBODIMENTS

Figure 1:
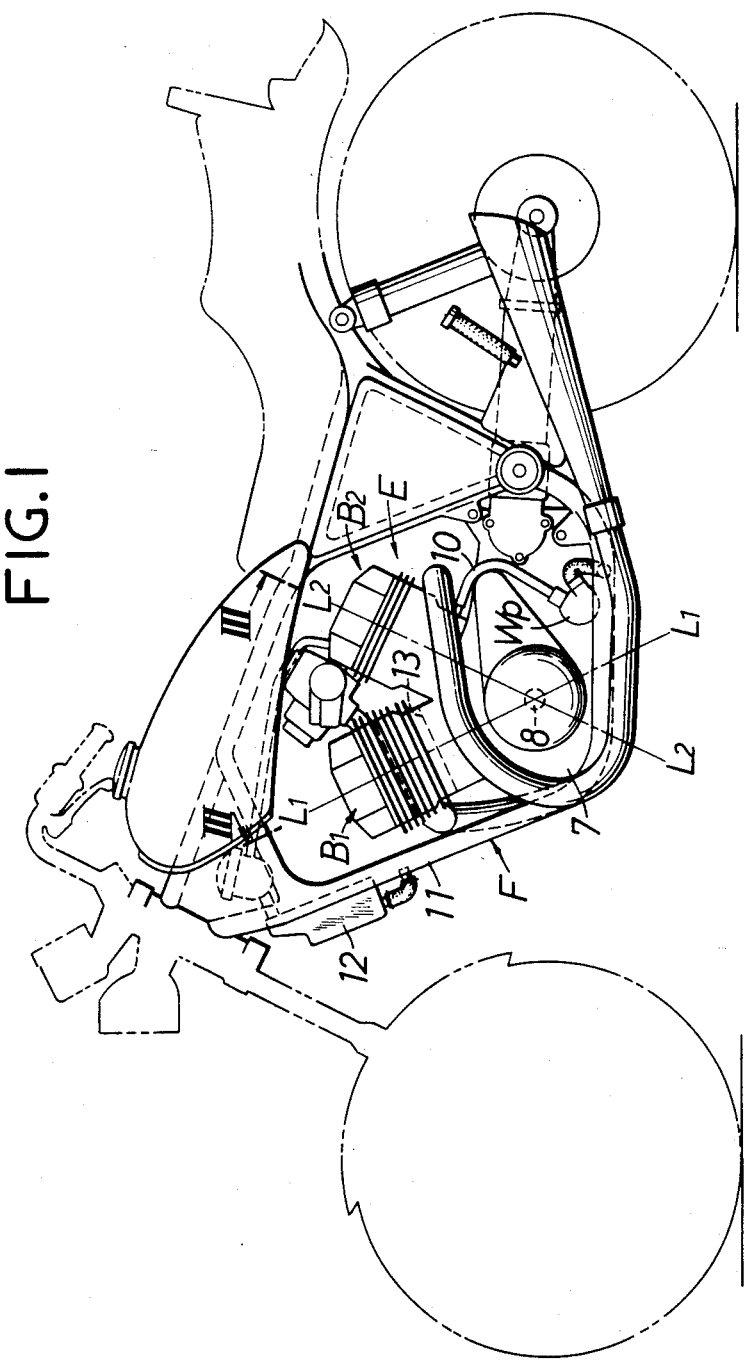
Figure 2:
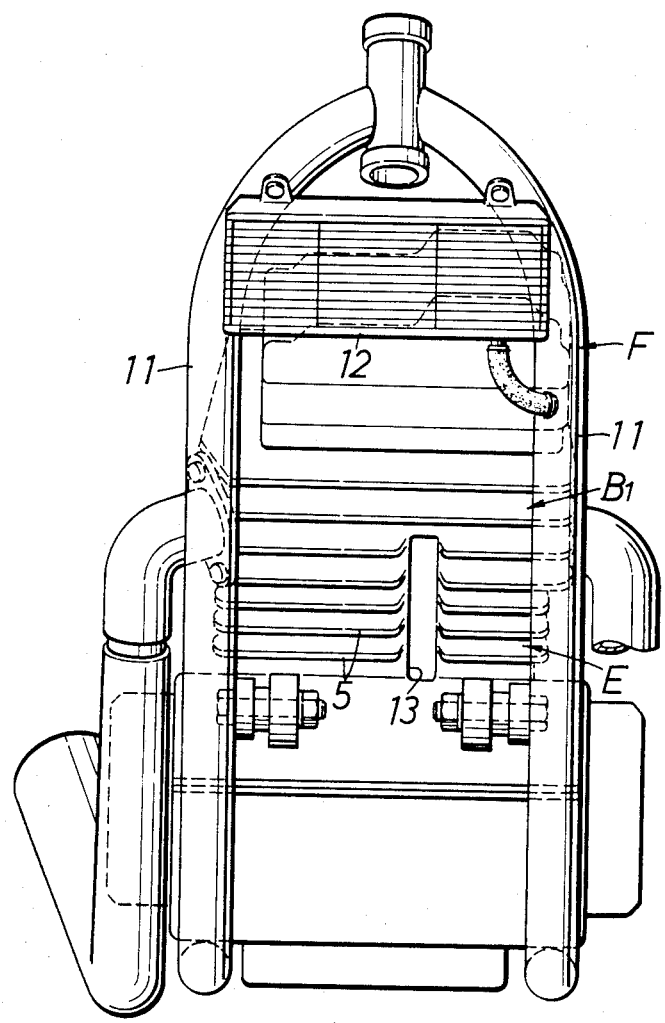
Figure 3:
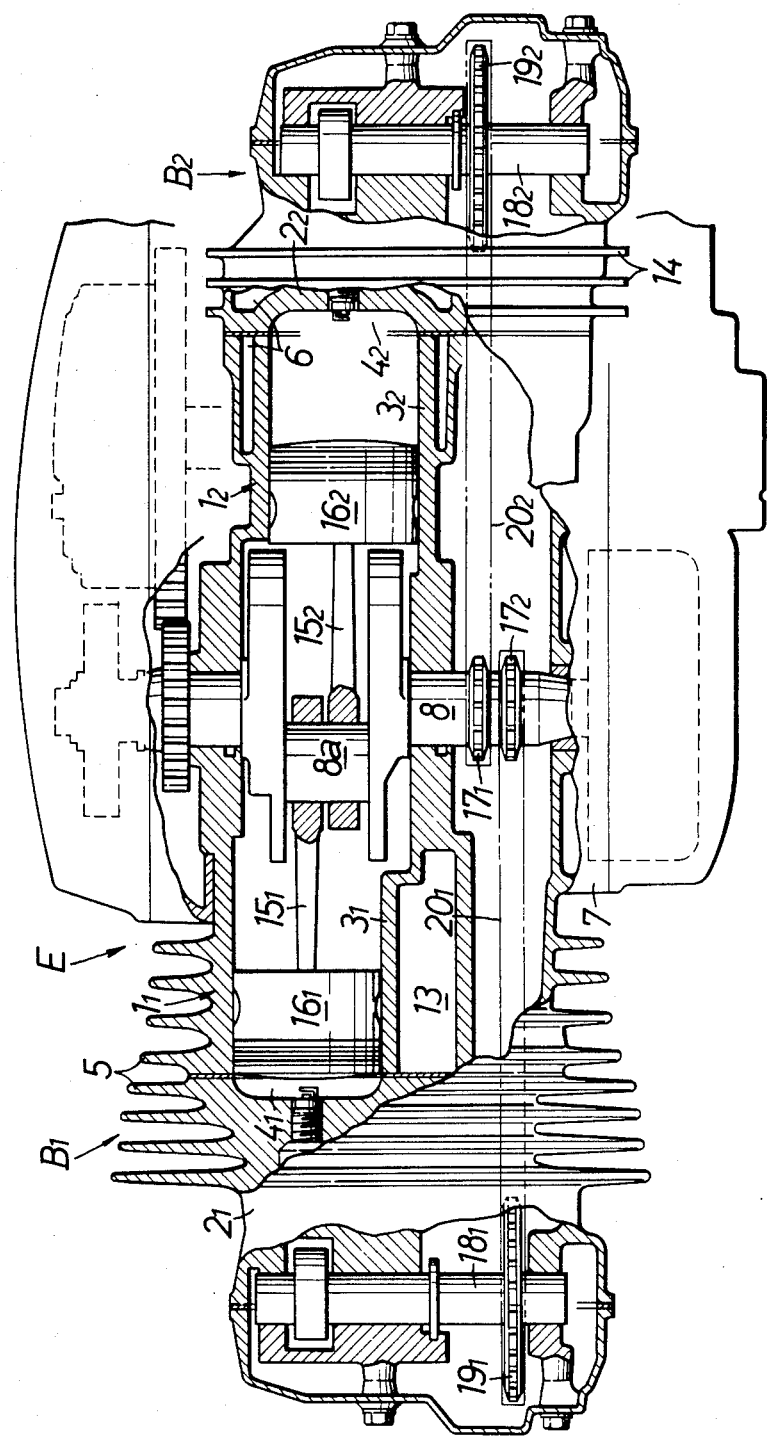

Referring to FIGS. 1 through 3, therein a first embodiment of the present invention is described.

In FIG. 1, a V-type engine E is mounted horizontally on a body frame F of a motorcycle, crankshaft 8 of the engine being arranged at right angles to the longitudinal direction of the vehicle body F. The engine E is equipped with a front engine block $B_1$ forwardly tilted from the body F and a rear engine block $B_2$ backwardly tilted therefrom, the front and rear engine blocks $B_1$, $B_2$ being arranged in a V shape along the longitudinal direction of the body F.

In FIG. 3, a plurality of projected cooling fins 5 are provided around a front cylinder block $1_1$ and a front cylinder head $2_1$ constituting the front engine block $B_1$ in such a manner as to enclose a cylinder $3_1$ and a combustion chamber $4_1$ contained therein, thus forming an air cooled type front engine block $B_1$, whereas a water jacket 6 is formed on the periphery of a rear cylinder block $1_2$ and a rear cylinder head $2_2$ constituting the rear engine block $B_2$ in such a way as to enclose a cylinder $3_2$ and a combustion chamber $4_2$, the water jacket 6 being connected to a conventional cooling water circuit. In other words, a water pump Wp (FIG. 1) coupled to the crankshaft 8 is arranged in the lower portion on one side of a crank and transmission case 7 of the V-type engine E and a water pipe 10 coupled with the water pump Wp communicates with the inlet of the water jacket 6. Moreover, a radiator 12 is supported in front of a down tube 11 of the body F and has its outlet connected with the inlet of the water pump Wp, the inlet of the radiator 12 being connected with the outlet of the water jacket 6.

In the front engine block $B_1$, a cooling air opening 13 longitudinally open at the front and rear of the front engine block $B_1$ is provided on the external side of the cylinder $3_1$; it is so arranged that the air is passed through the cooling air opening 13 during travel of the motorcycle and caused to strike the rear engine block $B_2$. In addition, cooling fins 14 are formed on the periphery of the rear cylinder head $2_2$ of the rear engine block $B_2$. Accordingly, the rear engine block $B_2$ is supplementarily cooled by the passing air.

The crankshaft 8 is rotatably supported in the crank and transmission case 7 at the intersection of the longitudinal center lines $L_1$—$L_1$, $L_2$—$L_2$ of the front and rear engine blocks $B_1$, $B_2$. Pistons $16_1$, $16_2$ in the cylinders $3_1$, $3_2$ are coupled to a crank pin $8a$ of the crankshaft 8 through connecting rods $15_1$, $15_2$. Driving sprockets $17_1$, $17_2$ are fastened to one end of the crankshaft 8 in parallel relation. Driven sprockets $19_1$, $19_2$ are respectively fastened to valve operating cam shafts $18_1$, $18_2$ rotatably supported on top of the rear cylinder heads $2_1$, $2_2$. Endless timing chains $20_1$, $20_2$ are wound around the driving sprockets $17_1$, $17_2$ and the driven sprockets $19_1$, $19_2$. The rotation of the crankshaft 8 is transmitted to the valve operating cam shafts $18_1$, $18_2$ through the timing chains $20_1$, $20_2$.

The operation of the first embodiment of the invention shown in FIGS. 1 through 3 will be subsequently described.

When a motorcycle is driven by the engine E, the front engine block $B_1$ is exposed to the travelling wind and is cooled by means of the cooling fins 5 provided on its periphery. In this case, part of the wind is made to pass through the cooling air opening 13 at the front engine block $B_1$ to cool it and then to strike the rear engine block $B_2$ to supplementarily cool the latter. On the other hand, the water pump Wp driven by the engine causes cooled water to flow through the water pipe 10 and then in the water jacket 6 in the rear engine block $B_2$ to cool it. The warmed water after cooling the engine block is circulated to the radiator 12 to be cooled there and returned to the water pump Wp.

Now referring to FIGS. 4 through 6, a second embodiment of the present invention will be described.

A steerable front wheel Wf and a rear wheel Wr, the latter being driven and turned by an engine E' that will be described later, are suspended in the front and rear parts of a motor scooter generally indicated by reference character S in FIG. 4. A seat 102 is mounted on the upper rear portion of a vehicle body 101. Left and right steps 104l, 104r for allowing the driver on the seat 102 to rest his feet are formed at the left and right sides of a floor plate 103 which can be detachably installed on the body 101 between the front and rear wheels Wf, Wr. In the transversely central portion of the floor plate 103, there is integrally provided a bulge portion 105 extending in the longitudinal direction of the body and having a convex cross section. Below the bulge portion 105 is formed a longitudinally extending tunnel 106 containing part of the engine E' and auxiliary equipment such as an air cleaner 107 and a carburetor 108 which will be described later.

The engine E' for driving the rear wheel Wr is suspended at the lower portion of the body 101 between the front and rear wheels Wf, Wr, this engine being a horizontal opposed multi-cylinder four-cycle engine. The engine is arranged horizontally, that is, its crankshaft 109 is placed at right angles to the longitudinal direction of the body 101. The front engine block $B_1'$ of the engine E' extends almost horizontally toward the front of the body 101, whereas the rear engine block $B_2'$ extends almost horizontally toward the rear of the body 101.

A plurality of cooling fins 110 project from the periphery of the front engine block $B_1'$ in such a manner as to enclose a cylinder 112 and a combustion chamber therein to form an air cooled engine block. On the other hand, a water jacket 111 is formed on the periphery of the rear engine block $B_2'$ in such a way as to enclose a cylinder 113 and a combustion chamber therein, the water jacket 111 being connected to a conventional cooling water circuit.

Pistons 114, 115 are inserted in the cylinders 112, 113 of the front and rear cylinder blocks $B_1'$, $B_2'$, respectively, so that the pistons can freely slide therein. These pistons 114, 115 are coupled to the crankshaft 109 through connecting rods 116, 117.

In a crank case 118 of the engine E', there is rotatably provided an output shaft 119 located in parallel with the crankshaft 109 and in the lower rear of the crankshaft 109.

Figure 4:
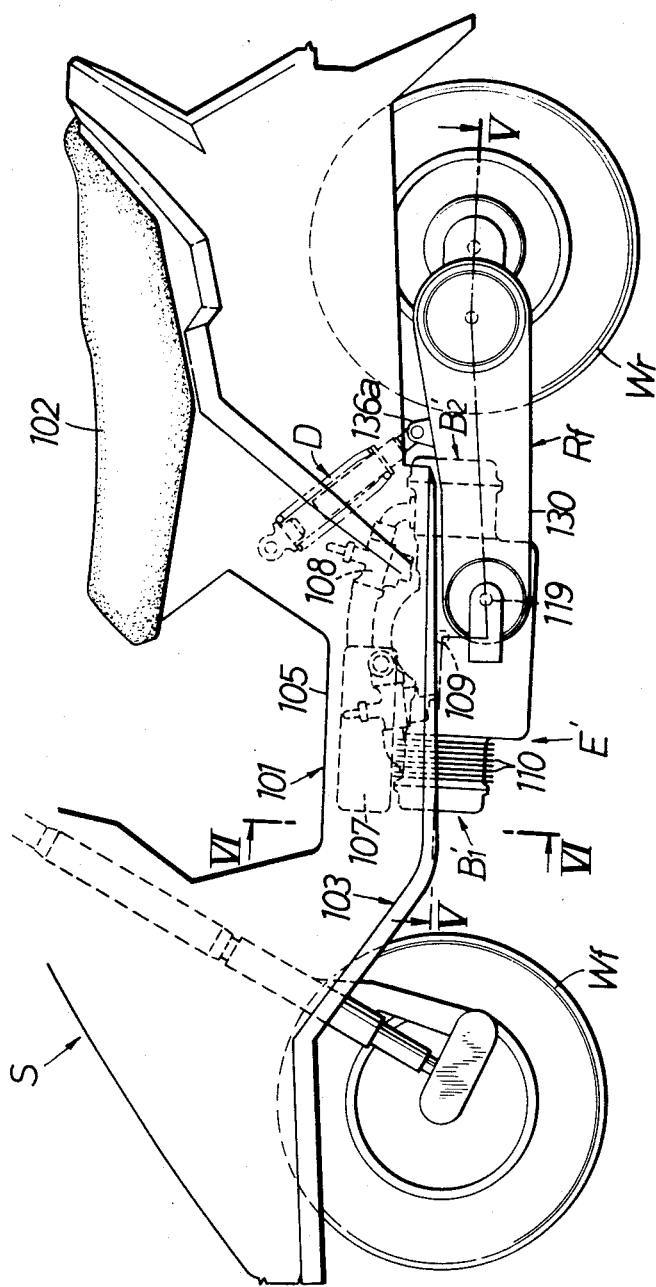
Figure 5:
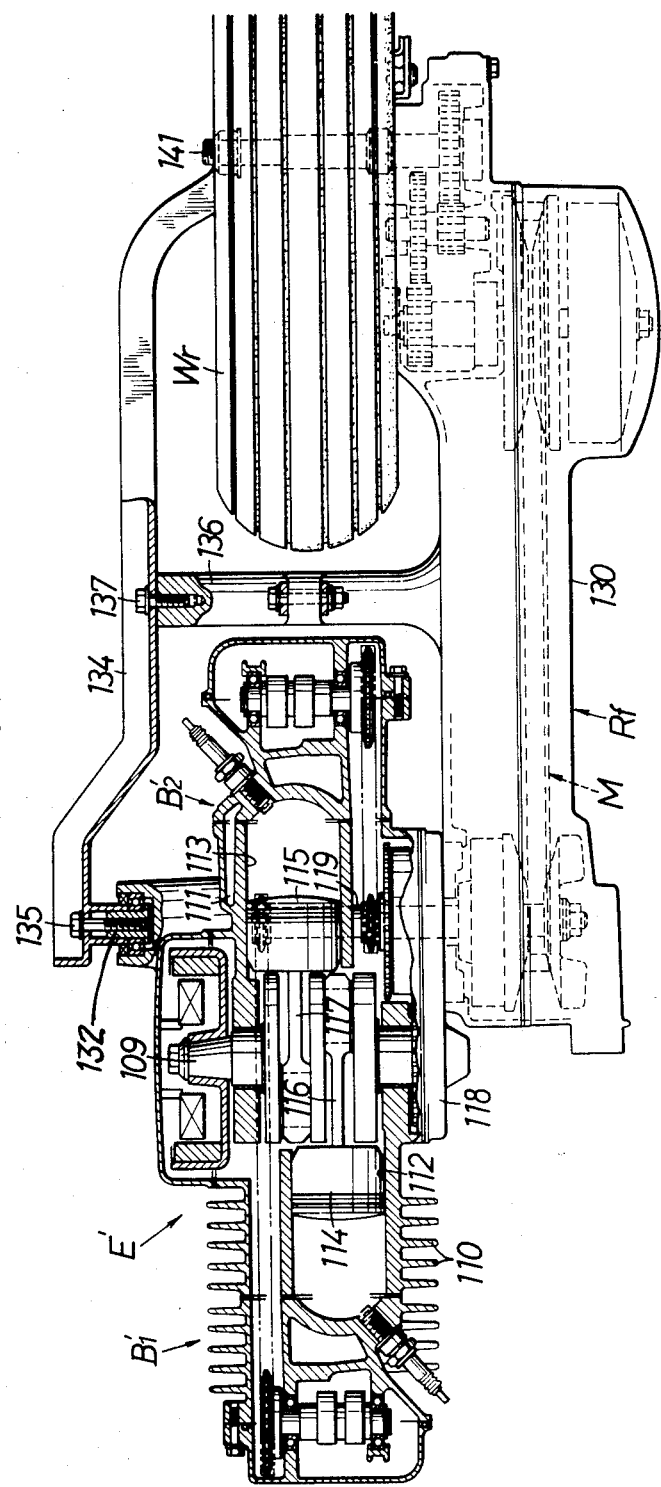
Figure 6:
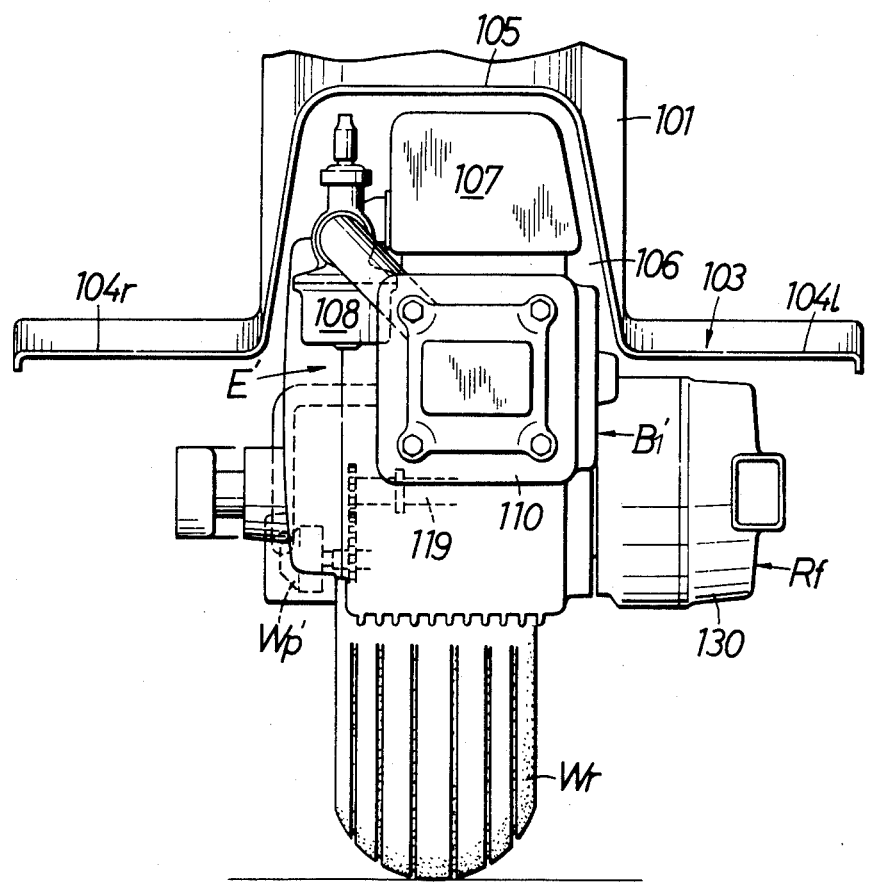

As shown in FIGS. 4 and 6, the air cleaner 107 and the carburetor 108 are provided above the longitudinal central portion of the horizontal opposed type engine E' and the upper portion of the engine E' together with the cleaner 107 and carburetor 108 are housed in the tunnel 106 formed in the transversely central portion of the floor plate 103, so that they are protected by the floor plate 103.

The front engine block $B_1'$ is arranged below the air cleaner 107 in the lower front of the tunnel 106 of the floor plate 103, whereas the rear engine block $B_2'$ is arranged below the carburetor 108 in the lower rear of the tunnel 106. Consequently, the wheelbase between the front and rear wheels Wf, Wr need not be made longer even with the provision of the rear engine block $B_2'$.

A known automatic transmission M mechanically coupled with the rear wheel Wr is coupled to the left end of the output shaft 119 and the water pump Wp' is operatively connected with the right end thereof via the power transmission mechanism. The water pump Wp' is used to supply cooling water to the water jacket 111 through the conventional cooling circuit.

The front end of a transmission case 130 which forms part of a rear fork Rf is supported at one end of the crank case 118 of the engine E' in a concentric relation to the output shaft 119 and this transmission case 130 can oscillate upwardly and downwardly around the axis of the output shaft 119. A pivot shaft 132 is rotatably supported at the other end of the crank case 118 on the same axial line as that of the output shaft 119 and an arm member 134 forming the remaining part of the rear fork Rf has its front end fastened to the pivot shaft 132 by a coupling bolt 135. A cross member 136 is integrally formed with the transmission case 130 at a longitudinally middle portion and is directed toward the arm member 134. The free end of the cross member 136 is integrally connected to a middle portion of the arm member 134 by a coupling bolt 137. The transmission case 130 and the arm member 134 thus united with each other, constitute the rear fork Rf for upward and downward oscillation around the axis of the output shaft 119.

Moreover, the cross member 136 is also used as a reinforcing member for the rear fork Rf itself. A boss 136a is integrally formed on the cross member 136 at its transversel center and a rear damper D suspended on the rear of the body 101 in a freely oscillatable manner is coupled to the boss 136a. The rear fork Rf is allowed to oscillate upwardly and downwardly in a balanced manner through the action of damper D, reducing distortion and deflection of the rear fork Rf.

A rear wheel axle 141 is suspended rotatably in a transverse direction between the opposed transmission case 130 and arm member 134. The rear wheel Wr located between the transmission case 130 and the arm member 134 is coupled to the axle 141.

The operation of the second embodiment shown in FIGS. 4 through 6 will be described in the following.

When the motor scooter travels, the front engine block $B_1'$ is directly exposed to the travelling wind and the engine block equipped with cooling fins 110 can be cooled by the air. On the other hand, because the water pump WP' is driven by the operation of the engine E', cooling water is caused to flow in the water jacket 111, thus cooling the rear engine block $B_2'$ by the water.

Although the invention has been described with reference to some preferred embodiments, it will be well understood by those skilled in the art that various changes and modification can be made thereto without departing from the spirit and scope of the invention as hereinafter claimed.

What is claimed is:

1. In a motorcycle engine equipped with a front engine block and a rear engine block arranged on a vehicle body in its longitudinal direction, each engine block including a cylinder and a cylinder head, the improvement comprising a cooling system for the engine in which the front and rear engine blocks include different means of cooling including cooling fins on said front engine block for air-cooling the front engine block, a water jacket means on said rear engine block for water-cooling the rear engine block, a radiator connected to said water jacket means on said rear engine block and pump means for circulating water between the radiator and water jacket means, the air cooled front engine block being devoid of a water jacket means and being separate from and independent of said radiator.

2. A cooling system as claimed in claim 1 wherein said engine has a crankshaft disposed at right angles to the longitudinal direction of said vehicle body, said front engine block being forwardly tilted while said rear engine block is backwardly tilted, such that said engine blocks are in a V form.

3. A cooling system as claimed in claim 1 wherein said engine has a crankshaft disposed at right angles to the longitudinal direction of said vehicle body, said front engine block extending substantially horizontally and forwardly while said rear engine block extends substantially horizontally and backwardly to form a horizontal opposed-type engine.

4. A cooling system as claimed in claim 1 wherein said front engine block has a cooling air opening extending through said front engine block in the longitudinal direction of said vehicle body, said opening being open at front and rear surfaces of said front engine block, and cooling fins on the periphery of the cylinder head of said rear engine block.

5. A cooling system as claimed in claim 4 wherein said engine includes a crankshaft, a valve operating mechanism and means for assisting operation of the valve operating mechanism in accordance with rotation of said crankshaft, said means being disposed on one lateral side of the front cylinder with a space therebetween, said space being used to provide a longitudinal passage for formation of said opening.

6. A cooling system as claimed in claim 5 wherein said opening opens at the rear surface of the front engine block to directly face the front surface of the rear engine block.

7. A cooling system as claimed in claim 1 wherein said engine has a crankshaft disposed at right angles to the longitudinal direction of the vehicle body, said crankshaft being common to both the front and rear engine blocks.

8. In a seating type motorcycle provided with steps for allowing the driver to place his feet on the lower portion of a vehicle body between the front and rear wheels, a cooling system for a horizontal opposed-type engine having a front engine block and a rear engine block and having a crankshaft disposed at right angles to the longitudinal direction of the vehicle body, each engine block including a cylinder and a cylinder head, the improvement wherein said front engine block and said rear engine block include different means of cooling wherein said front engine block includes cooling fins on its periphery to form an air colled engine block, whereas said rear engine block includes a water jacket means on its periphery to form a water cooled engine block, a radiator connected to said water jacket means on said rear engine block and pump means for circulating water between the radiator and water jacket means, the air cooled front engine block being devoid of a water jacket means and being separate from and independent of said radiator.

9. A cooling system for a seating type motorcycle as claimed in claim 8 wherein said front engine block extends substantially horizontally and forwardly while said rear engine block extends substantially horizontally and backwardly to form a horizontal opposed-type engine.

10. A method of cooling a horizontally disposed motorcycle engine having a front engine block facing frontwardly relative to forward travel of the motorcycle and a rear engine block facing rearwardly, each engine block including a cylinder and a cylinder head, said method comprising cooling the front and rear engine block according to respective different modes of cooling by air cooling the front engine block via cooling fins provided on the front engine block and circulating liquid coolant around the rear engine block by pumping said coolant between a radiator disposed in front of said rear engine block and a water jacket on said rear engine block to effect liquid cooling of the rear engine block, the air cooled front engine block being devoid of water jacket and being separate from and independent of end radiator whereby to provide said different modes of cooling.

11. A method as claimed in claim 10 comprising conveying cooling air flowing on said front engine block to said rear engine block to air cool the rear engine block in supplement to the liquid cooling thereof.

* * * * *